(12) United States Patent
Zhao et al.

(10) Patent No.: US 10,138,129 B2
(45) Date of Patent: Nov. 27, 2018

(54) CARBON SPHERES AND METHODS OF MAKING THE SAME

(71) Applicant: Ford Global Technologies, LLC, Dearborn, MI (US)

(72) Inventors: Haibo Zhao, Northville, MI (US); Patrick James Blanchard, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 15/163,297

(22) Filed: May 24, 2016

(65) Prior Publication Data
US 2017/0341941 A1    Nov. 30, 2017

(51) Int. Cl.
*B01J 13/04* (2006.01)
*B01J 13/20* (2006.01)
(Continued)

(52) U.S. Cl.
CPC .............. *C01B 32/318* (2017.08); *B01J 2/06* (2013.01); *B01J 4/002* (2013.01); *B01J 4/02* (2013.01);
(Continued)

(58) Field of Classification Search
None
See application file for complete search history.

(56) References Cited

U.S. PATENT DOCUMENTS 1,637,377 A * 8/1927 Heicke ..................... B22F 9/08
264/DIG. 37
2,460,977 A  2/1949 Davis et al.
(Continued)

FOREIGN PATENT DOCUMENTS

CN    102086036 A    6/2011
CN    104439237 A    3/2015

OTHER PUBLICATIONS

Wang, J. et al., "Chemical vapor infiltration tailored hierarchical porous CNTs/C composite spheres fabricated by freeze casting and their adsorption properties", RCS Advances, Jan. 20, 2015, 3 pgs.
(Continued)

*Primary Examiner* — Mary Lynn F Theisen
(74) *Attorney, Agent, or Firm* — Manila Johnston; Brooks Kushman P.C.

(57) ABSTRACT

Carbon particles are disclosed, as well as methods and systems for forming the particles. In one embodiment, the system may include a receiving vessel configured to receive a liquid carbon precursor and at least one orifice at a bottom of the receiving vessel and configured to release droplets of the precursor. A cooling vessel may be positioned below the receiving vessel to receive the droplets and configured to hold a coolant for solidifying the droplets into carbon precursor particles. The method may include introducing a liquid carbon precursor into a tank having a plurality of orifices defined therein such that droplets of the precursor are released from the orifices and solidifying the droplets in a cooling vessel positioned to receive the droplets from the orifices. The method may then include carbonizing the solidified droplets to form carbon particles. The particles may be solid or hollow.

17 Claims, 3 Drawing Sheets

(51) Int. Cl.
*B01J 2/06* (2006.01)
*C01B 32/05* (2017.01)
*C01B 32/318* (2017.01)
*B01J 19/06* (2006.01)
*C08K 7/18* (2006.01)
*C01B 32/384* (2017.01)
*B01J 4/00* (2006.01)
*B01J 4/02* (2006.01)

(52) U.S. Cl.
CPC .............. *B01J 13/04* (2013.01); *B01J 13/20* (2013.01); *B01J 19/06* (2013.01); *C01B 32/05* (2017.08); *C01B 32/384* (2017.08); *C08K 7/18* (2013.01); *C01P 2004/32* (2013.01); *C01P 2004/61* (2013.01)

(56) References Cited

U.S. PATENT DOCUMENTS

| | | | |
|---|---|---|---|
| 3,331,783 A | | 7/1967 | Braun et al. |
| 3,891,574 A | | 6/1975 | Kobayashi et al. |
| 4,303,736 A | * | 12/1981 | Torobin .................. B01J 13/22 126/709 |
| 4,671,909 A | * | 6/1987 | Torobin .................. B01J 13/04 166/280.1 |
| 4,782,097 A | * | 11/1988 | Jain ........................ B01J 13/12 521/141 |
| 4,814,274 A | * | 3/1989 | Shioya ..................... A23L 2/00 264/4 |
| 5,212,143 A | * | 5/1993 | Torobin ................... B01J 13/04 264/129 |
| 6,165,615 A | * | 12/2000 | Itakura ..................... A61K 8/11 428/407 |
| 7,156,958 B2 | | 1/2007 | Hwang |
| 7,816,007 B2 | | 10/2010 | Aikyou et al. |
| 2005/0079354 A1 | | 4/2005 | Iijima et al. |
| 2007/0183959 A1 | | 8/2007 | Charlier et al. |
| 2008/0182019 A1 | * | 7/2008 | Retter ...................... B01J 13/04 427/214 |
| 2009/0215154 A1 | * | 8/2009 | Ganan Calvo ....... A61K 9/5138 435/252.33 |
| 2011/0052645 A1 | * | 3/2011 | Coulter ................ A61K 9/1617 424/400 |
| 2011/0180513 A1 | | 7/2011 | Luhrs et al. |
| 2014/0178580 A1 | * | 6/2014 | Whiffen ................ A24B 15/283 427/212 |
| 2014/0255786 A1 | | 9/2014 | Oh et al. |

OTHER PUBLICATIONS

Lin, Q. et al., "Preparation of solid carbon spheres by pyrolysis of allyl COPNA-BMI resin", Journal of Analytical and Applied Pyrolysis, Sep. 2010, 2 pgs., vol. 89, Issue 1, Abstract Only.

* cited by examiner

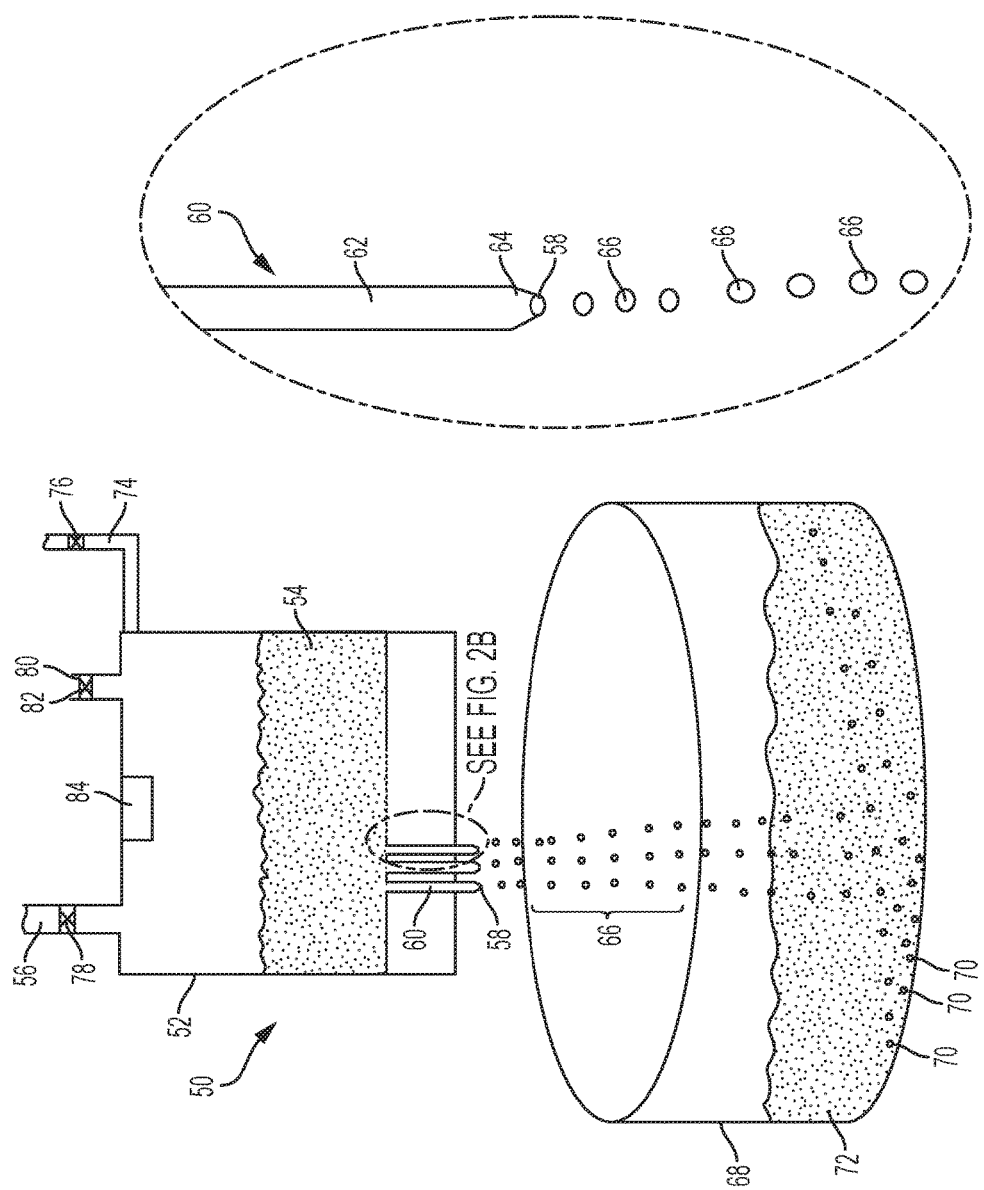

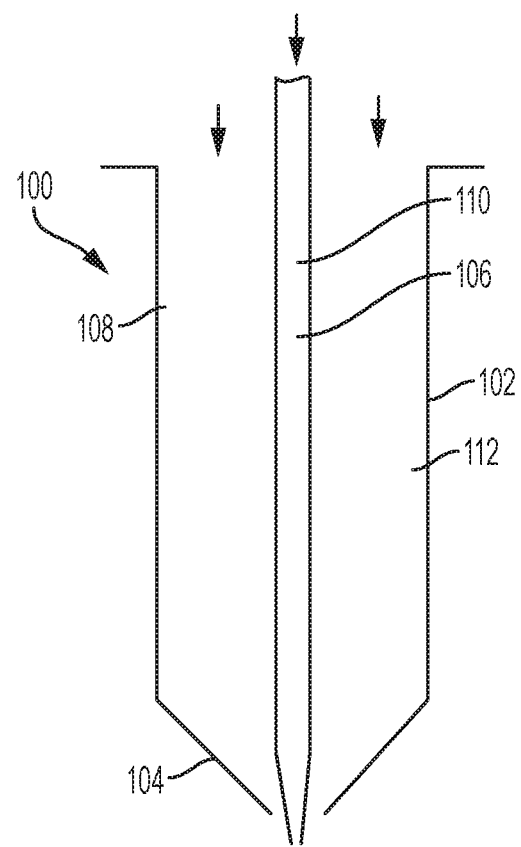
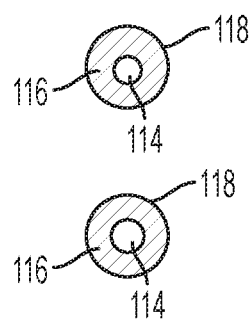
FIG. 3

CARBON SPHERES AND METHODS OF MAKING THE SAME

TECHNICAL FIELD

The present disclosure relates to carbon spheres and methods of making the same, for example, micro carbon spheres.

BACKGROUND

Increased fuel economy is an important goal for vehicle manufacturers. The desire for improved fuel economy may be driven by fuel costs, emissions standards (e.g., for carbon dioxide), improved range, or other reasons. One approach to improving fuel economy is using lightweight materials to reduce vehicle weight. Carbon products are generally low-density materials with good mechanical properties. Currently, carbon fiber is generally used in applications such as aerospace, wind energy, sporting goods, and high-end vehicles. These applications are generally lower in volume and higher in price compared to high-volume vehicles. Implementation of carbon products into high-volume, non-luxury vehicles in the auto industry poses some challenges. One of the challenges is developing low-cost processing technology for high-volume production. A sheet molding compound (SMC) process has been used to manufacture glass fiber reinforced parts, such as decklids, hoods, bumpers, and others. However, the same SMC process may not be suitable for carbon products due to differences in the physical properties of the two material or product types.

SUMMARY

In at least one embodiment, a system is provided. The system may include a receiving vessel configured to receive a liquid carbon precursor; at least one orifice at a bottom of the receiving vessel and configured to release droplets of the precursor; and a cooling vessel positioned below the receiving vessel to receive the droplets and configured to hold a coolant for solidifying the droplets into carbon precursor particles.

The vessel may include at least one tube and one of the at least one orifice may be defined at an end of each of the at least one tube. The at least one tube may include a main body portion and a narrower tip portion. In one embodiment, the at least one tube may include an inner lumen configured to receive a fluid and an outer lumen configured to receive the liquid carbon precursor. An end of the inner lumen may extend passed an end of the outer lumen. The at least one tube may be configured to release droplets of the precursor having an inner core comprised of the fluid. The fluid may be a gas or a liquid polymer. In one embodiment, the inner core has a diameter being at least 10% of a diameter of the droplets.

In one embodiment, the vessel includes a gas inlet connected to a pressurized gas source and a gas valve configured to control gas flow from the pressurized gas source into the vessel. The vessel may include a pressure sensor and a gas vent configured to release gas from the vessel to reduce an air pressure in the vessel. The system may include an oven configured to carbonize the carbon precursor particles into carbon particles comprising at least 90 wt. % carbon. In one embodiment, the at least one orifice may include at least 100 orifices. The at least one orifice may be configured to release droplets having a diameter of 10 to 400 µm.

In at least one embodiment, a method is provided. The method may include introducing a liquid carbon precursor into a tank having a plurality of orifices defined therein such that droplets of the precursor are released from the orifices; solidifying the droplets in a cooling vessel positioned to receive the droplets from the orifices; and carbonizing the solidified droplets to form carbon particles.

The plurality of orifices may release droplets having a diameter of 10 to 400 µm and the carbonizing step may include carbonizing the solidified droplets to form carbon particles having a diameter of 10 to 400 µm. Each of the plurality of orifices may be defined at an end of a tube and the droplets of the precursor may be released from the tube. The method may further include introducing a fluid into an inner lumen of the tube and introducing the liquid carbon precursor into an outer lumen of the tube to form droplets having an outer shell of the precursor and an inner core of the fluid; and carbonizing the droplets to form hollow carbon particles having an outer shell of carbon and a gas-filled core. In one embodiment, the method further comprises including the carbon particles into a sheet molding compound.

In at least one embodiment, a composite vehicle component is provided. The component may include a polymer matrix; and a plurality of carbon spheres dispersed throughout the polymer matrix, the carbon spheres having a diameter of 10 to 300 µm and including at least 90 wt. % carbon.

BRIEF DESCRIPTION OF THE DRAWINGS

FIG. 2A is a schematic of a system for forming carbon precursor particles or spheres, according to an embodiment;

FIG. 2B is an enlarged view of a tube for forming carbon precursor particles or spheres, according to an embodiment;

FIG. 3 is a schematic cross-section of a tube for forming hollow carbon precursor particles or spheres, according to an embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It has been discovered that small carbon particles or spheres may be used as a reinforcement or filler in composites. The carbon spheres may be micro carbon spheres, having a size/diameter in the micron scale (e.g., 1-1,000 µm). The carbon spheres may be solid or hollow and may be included in composites, such as SMC composites. The carbon spheres may be used in automotive components, for example, decklids, hoods, bumpers, and others. Carbon spheres are disclosed, as well as methods to produce the carbon spheres and hollow carbon spheres.

Figure 1A:
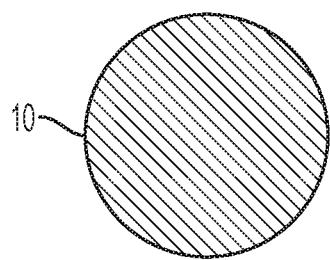
FIG. 1A is a schematic cross-section of a solid carbon particle or sphere, according to an embodiment.
Figure 1B:
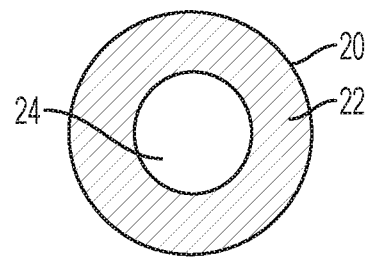
FIG. 1B is a schematic cross-section of a hollow carbon particle or sphere, according to an embodiment.

With reference to FIGS. 1A and 1B, example cross-sections of carbons spheres are shown. FIG. 1A shows a solid carbon particle or sphere 10 and FIG. 1B shows a hollow carbon particle or sphere 20. The solid carbon sphere 10 may be solid such that it has a substantially uniform density throughout. The term "solid" does not necessarily require the sphere 10 to be non-porous. In contrast, the hollow carbon sphere 20 may have an outer shell 22 and an empty core 24 (e.g., filled with air). The outer shell 22 may have a uniform density throughout. The core 24 may be substantially spherical and may be at a center of the hollow carbon sphere 20.

In one embodiment, the diameter of the core 24 may be from 5 to 90 percent of the diameter of the hollow sphere 20, or any sub-range therein. For example, the diameter of the core 24 may be from 10 to 80 percent, 20 to 80 percent, 20 to 70 percent, 30 to 80 percent, 30 to 70 percent, 40 to 80 percent, 40 to 70 percent, 20 to 60 percent, 30 to 60 percent, or 40 to 60 percent of the diameter of the hollow sphere 20, or other ranges. In another embodiment, the diameter of the core 24 may be at least 5 percent of the diameter of the hollow sphere 20, for example, at least 10, 20, 30, 40, 50, 60, or 70 percent of the diameter of the hollow sphere 20.

In one embodiment, the diameter of the solid carbon spheres 10 and/or the hollow carbon spheres 20 may be from 5 to 500 μm, or any sub-range therein. For example, the diameters may be from 5 to 400 μm, 10 to 400 μm, 10 to 300 μm, 10 to 200 μm, 25 to 200 μm, 50 to 300 μm, 50 to 200 μm, 50 to 150 μm, 100 to 200 μm, or 100 to 150 μm. While the carbon particles are generally referred to herein as spheres, they may not be perfectly spherical. For example, the particles may be generally spherical but may have a faceted surface. The particles may be spheroid in shape or other shapes such as egg-shaped, oval-shaped, or teardrop-shaped.

With reference to FIG. 2A, a system 50 is shown for producing carbon spheres, for example, solid carbon spheres such as solid carbon spheres 10. The system 50 includes a precursor tank or vessel 52 which may receive and hold molten or liquid precursor material 54. The precursor material may be received from a holding tank or vessel (not shown). The holding tank may maintain the precursor material above its melting temperature to keep it in a liquid state. In one embodiment, the precursor tank 52 may be heated to prevent the precursor material 54 from solidifying. The heating may be performed using any suitable method, such as built-in heating elements (e.g., resistive, induction, etc.) or by applied external heat (e.g., infrared, flame, etc.). The precursor material may be a polymer that can be converted into high purity carbon, for example, at least 90 or 95 wt. % carbon. In one embodiment, the precursor material may be polyacrylonitrile (PAN), made from acrylonitrile. However, the precursor material may include other precursors capable of conversion into high purity carbon, such as rayon, polyethylene, polypropylene, or pitch-based precursors. The precursor material may be a pure precursor (e.g., liquid PAN) or it may include the precursor and a solvent. Including a solvent may reduce the temperature needed to keep the precursor material in a liquid state.

In one embodiment, the precursor material 54 may be introduced into the tank 52 through a precursor inlet 56. The inlet 56 may receive the precursor material 54 from a tank or other storage vessel (not shown). Within the tank 52, for example, at the bottom of the tank 52, one or more orifices 58 may be defined. The orifices 58 may each be formed at the end of a tube, channel, or pipette 60. The tube(s) 60 may extend at least partially out from the tank 52 or may be internal to the tank 52 with the orifice 58 flush or substantially flush to the tank 52. While several tubes 60 are shown, there may be a single tube 60 or a plurality of tubes 60. In one embodiment, there may be tens or hundreds of tubes 60. For example, there may be at least 25, 50, 100, 250, 500, or 1,000 tubes 60 defined in and/or extending from the tank 52.

With reference to FIG. 2B, a zoomed-in view of a tube 60 is shown. The tube 60 may have a main body 62 and a tip 64. The orifice 58 may be defined in the tip 64. In one embodiment, the tip 64 may be narrower than the main body 62. The precursor material 54 may travel from the tank 52, through the main body 62 of the tube 60, and exit the orifice 58. As the precursor material 54 exits the orifice 58 (e.g., at the tip 64), it may form a droplet 66. The droplet 66 may remain suspended from the tip 64 for a period of time due to surface tension. As the droplet 66 grows, the force of gravity may ultimately overcome the surface tension and the droplet 66 may fall from the orifice 58. The droplet 66 may form a sphere or a generally spherical particle as it falls from the orifice due to surface tension (e.g., the driving force to have the smallest possible surface area per unit volume). Once one droplet 66 forms and falls, another may begin to form. Accordingly, a series or stream of droplets 66 may be formed by precursor material 54 exiting the tube 60.

The size or diameter of the droplets 66 or the resulting spherical particle may depend on several factors. One factor may be the size of the orifice 58, with the size of the droplet generally increasing as the orifice size increases. Another factor may be the shape or geometry of the orifice and/or tip 64. For example, the angle of the tip 64 as it narrows from the main body 62 may affect the droplet size (in general, a smaller diameter tip will result in lower surface tension and a smaller droplet). The force exerted by the precursor material 54 above the orifice may also affect the droplet size. For example, if the tank 52 is full there may be more pressure exerted on the precursor material in the tube(s) 60 and the droplets 66 may be pushed out of the orifice 58 faster than if the tank was nearly empty. Also, if additional or external pressure is exerted on the precursor material 54, a similar result may occur (e.g., smaller droplets). The above effects may be based on a constant precursor material, however, different precursor materials may also have different droplet sizes when the above factors are held constant (e.g., due to viscosity, surface tension, density, etc.) In one embodiment, the relationship between the size of the droplets and the orifice geometry may be generally determined based on the following relationship:

$$mg = \pi d\gamma = \rho v g = \rho (4/3) \pi r^3 g$$

In the above relationship, m is the mass of the droplet, g is the gravitational acceleration due to gravity, d is the orifice diameter, γ is the surface tension of the liquid, ρ is the density of the liquid, v is the volume of the droplet, and r is the radius of the droplet (assuming it is a sphere).

Beneath the tank 52, a cooling receptacle, vessel, or bath 68 may be positioned to receive the falling droplets 66. As described above, there may be one, several, hundreds, or thousands of orifices 58 or tubes 60 releasing droplets of liquid precursor material 54 from the tank 52. The cooling bath 68 may be configured to catch or receive the droplets 66 after they exit the orifice/tube and to cool and solidify the droplets 66 in solid phase spheres 70. The cooling bath 68 may include a liquid cooling medium 72. In one embodiment, the liquid cooling medium 72 may be water. However, any suitable cooling medium may be used that will not significantly react with or alter the precursor material 54 (other than to solidify it). For example, some organic materials may react with or contaminate the precursor material, therefore, in one embodiment, the coolant may not include an organic material. The liquid cooling medium 72 may be at room temperature or ambient temperature (e.g., about 15-25° C.). However, the liquid cooling medium 72 may also be above room temperature, as long as it is cooler than the melting temperature of the precursor material 54. In one embodiment, the liquid cooling medium may be maintained from 15-100° C., or any sub-range therein, such as 20-80° C., 20-60° C., 20-40° C., or 15-30° C.

Non-liquid cooling mediums could also be used, such as cooled air/gas, dry ice (e.g., solid carbon dioxide), or others. It may also be possible to solidify the precursor material 54 may cooling the receptacle itself. For example, if the receptacle 68 is metal, it may be cooled such that when the droplet 66 contacts it the heat from the droplet is absorbed by the receptacle. However, this may flatten the droplets 66 into a disc or "pancake" type shape. Accordingly, the liquid droplets 66 may fall into the cooling bath 68 and be solidified. The solidified droplets may maintain their shape (e.g., spheres or spheroids) when they are received by the cooling bath (e.g., in water) to produce solid precursor particles 70.

In the embodiments described above, the droplets 66 were described as exiting or falling from the orifice 58 due to the force of gravity. In another embodiment, the droplets 66 may be pushed or forced out of the orifice 58 under additional or external pressure. For example, air pressure in addition to the ambient/atmospheric pressure in the tank 52 may be applied to the precursor material 54 in the tank to increase the rate of droplet formation and dripping or exiting. By applying additional pressure, the droplets 66 may form and/or fall faster than they would due to gravity alone. In addition, the size and/or shape of the droplets may be adjusted by the applied pressure. In another embodiment, the pressure applied may be sufficient to form a continuous stream of precursor material instead of discrete droplets. The stream may cool and form carbon cylinders when it is solidified in the cooling bath. For example, the stream may break into discrete cylinders upon solidifying. The cylinders may have a diameter similar to the diameters of the spheres described above. The cylinders may have a length of up to 500 μm, for example, up to 400 μm or up to 250 μm. In one embodiment, the cylinders may have a length of 100 to 500 μm, 200 to 500 μm, or 300 to 500 μm.

With reference to FIG. 2A, the additional air pressure may be applied through an air/gas supply or inlet 74, such as a pipe, tube, or conduit, which may include a regulator or valve 76. The air supply 74 may be connected to a source of pressurized gas, such as air or other gases. In one embodiment, the pressurized gas may be an inert or non-reactive gas, such as nitrogen or argon. Other gases or gas mixtures may also be used, provided they do not significantly react with the precursor material 54. Accordingly, in one embodiment, the tank 52 may be a sealed tank such that an air pressure above the ambient or atmospheric pressure may be maintained. The precursor inlet 56 may therefore include a closable air-tight valve 78.

In addition to an air supply 74, there may be an air/gas vent 80, such as a pipe, tube, or conduit, which may include a regulator or valve 82. The precursor inlet, the air supply, the air vent, and their associated valves may be operated by a controller (not shown). Therefore, when additional precursor is required in the tank 52, the inlet 56 may be opened, and when the air pressure is to be adjusted, the valves in the air supply and vent may be controlled to reach a desired pressure. A pressure sensor 84 may be located within the tank and connected to the controller to provide pressure feedback. In one embodiment, the air pressure in the tank may be maintained slightly above the atmospheric/ambient pressure. For example, the pressure may be at least 101% of the atmospheric/ambient pressure, such as at least 105% or at least 110% of the atmospheric/ambient pressure. In another embodiment, the pressure may be from 101% to 125% of the atmospheric/ambient pressure, or any sub-range therein, such as 101% to 115%, 101% to 110%, 105% to 125%, or 105% to 115% of the atmospheric/ambient pressure.

After the solid precursor particles or cylinders have been cooled and solidified, they may be retrieved from the cooling bath (e.g., by sifting/straining or other methods) and converted into carbon spheres/particles/cylinders (e.g., high purity carbon) by a heat treatment. It has been discovered that a process similar to that for producing carbon fibers may also convert the precursor spheres into carbon spheres. However, since the carbon spheres are not continuous like fibers, transporting them between furnaces or other steps in the process may require additional or different equipment. For example, the carbon spheres may be transported using a moving conveyor belt between furnaces or other equipment. The production of pure or substantially pure carbon fibers from a precursor is known in the art and will not be described in detail. In general, the conversion of precursor particles to high purity carbon may include the steps of oxidation, carbonization, and (optionally) surface treatment. However, any method for converting a precursor to high purity carbon may be compatible with the present disclosure. The precursor spheres may be inserted or fed through one or more ovens in an oxidation step. The oxidation temperature may range from about 200° C. to 300° C. The process may cause the polymer chains in the precursor to crosslink and increase in density. The oxidized spheres may contain about 50 to 65 percent carbon molecules after oxidation, with elements such as hydrogen, nitrogen and oxygen forming the balance.

In the carbonization step, the spheres may be heated again, but in an inert or oxygen-free atmosphere. Without oxygen, non-carbon molecules may be removed from the spheres. The carbonization step may include heating at one or more temperatures, for example, a first, lower temperature and a second, higher temperature. The temperatures may range, for example, from 700° C. to 1500° C. During carbonization, crystallization of the carbon molecules occurs and the finished spheres may be more than 90 percent carbon (e.g., by weight), such as at least 95, 97, or 99 percent. To achieve carbon levels at the higher end, an additional crystallization step may be required.

After carbonization, the spheres may receive a surface treatment and/or a coating, which may be the same or similar to the coating that is typically applied to carbon fibers. The surface treatment may include exposing the spheres to an electrochemical or electrolytic bath that contains solutions to etch or roughen the surface of each sphere. A coating, generally called sizing, may then be applied to the spheres. The sizing may protect the carbon spheres during handling and processing so that the sphere surfaces are not scratched or damaged. After the sizing is applied and has dried, the spheres may be collected for later incorporation into a composite component, such as an SMC component.

With reference to FIG. 3, another embodiment of a tube 100 is shown for forming droplets of liquid carbon precursor. The tube 100 may replace or be used in conjunction with the tube(s) 60 shown in FIG. 2A. The tube 100 may be configured to form hollow carbon spheres or particles, such as hollow particle 20 in FIG. 1B. The tube 100 may include a main portion 102 and a tip 104. The tube 100 may include an inner tube portion 106 and an outer tube portion 108. The inner and outer tube portions may be concentric, such that the inner tube portion 106 is disposed within the outer tube portion and the portions have a common center axis. Accordingly, the tube 100 may be a dual-lumen or dual-cannula tube. The inner and outer tube portions may be divided such that they form separate fluid-carrying paths or passages, one within the other.

At the tip 104, the inner and/or outer tube portions may narrow relative to their diameters in the main portion 102. In at least one embodiment, the inner tube portion 106 may extend axially beyond or stick out passed the outer tube portion 108 at the tip 104. In one embodiment, the inner tube portion 106 may be configured to receive a core fluid 110 and the outer tube portion 108 may be configured to receive a liquid carbon precursor 112 (e.g., similar to precursor 54). The liquid carbon precursor 112 may be received from the tank 52, similar to the tube(s) 60. The core fluid 110 may be a gas or a liquid. If it is a gas, it may be air or another gas, such as nitrogen or argon. The gas may be the same or different from the gas used to apply additional pressure, in some embodiments. If the gases are the same, the same source (e.g., tank) may supply the gas to both the tank 52 and the inner tube portion 106. If the core fluid is a liquid, it may be a liquid or melted polymer, such as a polyolefin (e.g., PE, PP, etc.). However, other polymers may also be used. Other liquids may also be used, for example, water or ethanol. The core fluid 110 may be received from a separate tank or supply vessel, either within or external to the tank 52.

In operation, the inner tube portion 106 may receive the core fluid 110 and the outer tube portion 108 may receive the liquid carbon precursor 112. The outer tube portion 108 may surround the inner tube portion 106 such that as the two materials/components exit the tip 104, the core fluid 110 forms a core 114 that is surrounded or encapsulated by a shell 116 of the precursor 112. If the core fluid 110 is a gas, such as air, the core 114 may be an empty void (except the gas). If the core fluid 110 is a liquid, such as a polymer, the core 114 may be a sphere or sphere-like solid core. As described above, the inner tube portion 106 may extend passed the outer tube portion 108 at the tip 104, as shown. This configuration may facilitate the formation of the core 114, as the precursor material 112 may be prevented from forming a solid droplet due to the presence of the inner tube portion 106. When the core fluid 110 flows out of the inner tube portion 106 it may occupy space within the precursor 112 or expand the precursor 112 around it to form a hollow or core/shell droplet 118.

Similar to the solid droplets, the core/shell droplets 118 may be spherical or sphere-like (e.g., spheroid, egg, tear drop). The surface tension of the droplets may cause the shell 116 to form a spherical or sphere-like shape as they fall from the tube 100. Similarly, the core 114 may form a sphere or sphere-like shape inside the shell 116. As with the solid droplets, the core/shell droplets 118 may fall from the tube 100 and into the cooling bath 68. In the cooling bath 68, the precursor material 112 may cool and solidify to form a solid shell. If the core fluid 110 is a liquid, it may solidify in the cooling bath 68 to form a solid core. However, if the liquid has a lower freezing point than the temperature of the cooling bath 68, then the core fluid 110 may remain a liquid within the solid shell. The solidified hollow or core/shell spheres or particles may then be carbonized using the same process described above. During the carbonization process, if the core fluid 110 was a liquid, such as a polymer or water, it may be decomposed or vaporized by the elevated temperatures and may escape the shell. As a result, the final sphere or particle may be a hollow sphere or particle (e.g., as shown in FIG. 1B), regardless of the core fluid used.

The solid and/or hollow carbon particles or spheres may be incorporated into a composite component. The particles may act as a reinforcement and/or a filler due to their high strength and low weight/density. The hollow particles may be particularly effective as a filler, since their overall density and weight are reduced by the empty core inside the carbon shell. The particles may be incorporated into a composite component for a vehicle, such as a decklid, hood, bumper, structural member, or others. In one embodiment, the carbon solid and/or hollow particles may be incorporated into a SMC process and component.

In one embodiment, after the carbon spheres have been carbonized and collected, they may be deposited, spread, or dropped onto to a receiving surface. The receiving surface may be stationary or it may be moving. The receiving surface may form part of a SMC process. For example, the receiving surface may be a carrier film (e.g., polymer film) having a resin applied thereon. Therefore, the carbon spheres may be deposited onto the resin-carrying film and a second carrier film having a resin applied thereon may be applied on top of the carbon spheres to form a carbon sphere reinforced SMC material. The SMC material may be compacted (e.g., by rollers) and stored for later use, such as on a take-up roll. Alternatively, the SMC material may be transported for immediate or semi-immediate further processing, such as a molding operation. After the molding operation, the carbon spheres may be included in a component (e.g., vehicle component) dispersed within a solidified polymer matrix.

In addition to a SMC process, the disclosed carbon spheres (solid and/or hollow) may be included in other composite forming processes (or may be used to form composites in typically non-composite processes). For example, the carbon spheres may be included in the shot material for an injection molding process. In one embodiment, the carbon spheres may be included in the solid pellets used to form the shot material. The carbon spheres may be added to the compounder when forming the pellets. The carbon spheres, either included in pellets or on their own, may be incorporated into other processes, as well. For example, the spheres may be added during compression molding processes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a receiving vessel configured to receive a liquid carbon precursor;
 at least one orifice at a receiving vessel bottom, the at least one orifice configured to release droplets of the precursor;
 a cooling vessel positioned below the receiving vessel to receive the droplets and configured to hold a coolant for solidifying the droplets into carbon precursor particles; and
 an oven configured to carbonize the carbon precursor particles into carbon particles comprising at least 90 wt. % carbon.

2. The system of claim 1, wherein the receiving vessel includes at least one tube and each of the at least one orifice is defined at an end of one of the at least one tube.

3. The system of claim 2, wherein the at least one tube includes a main body portion and a narrower tip portion.

4. The system of claim 2, wherein the at least one tube includes an inner lumen configured to receive a fluid and an outer lumen configured to receive the liquid carbon precursor.

5. The system of claim 4, wherein an end of the inner lumen extends past an end of the outer lumen.

6. The system of claim 4, wherein the at least one tube is configured to release droplets of the precursor having an inner core comprised of the fluid.

7. The system of claim 6, wherein the fluid is a gas.

8. The system of claim 6, wherein the fluid is a liquid polymer.

9. The system of claim 6, wherein the inner core comprises at least 10% of a diameter of the droplets.

10. The system of claim 1, wherein the receiving vessel includes a gas inlet connected to a pressurized gas source and a gas valve configured to control gas flow from the pressurized gas source into the vessel.

11. The system of claim 10, wherein the receiving vessel includes a pressure sensor and a gas vent configured to release gas from the receiving vessel to reduce an air pressure in the receiving vessel.

12. The system of claim 1, wherein the at least one orifice includes at least 100 orifices.

13. The system of claim 1, wherein the at least one orifice is configured to release droplets having a diameter of 10 to 400 µm.

14. A system comprising:
   a receiving vessel for a liquid carbon precursor and including at least one orifice at a bottom thereof for releasing droplets of the precursor;
   a cooling vessel below the receiving vessel for receiving the droplets and for solidifying the droplets into carbon precursor particles; and
   an oven for carbonizing the carbon precursor particles into carbon particles comprising at least 90 wt. % carbon.

15. The system of claim 14, wherein the oven provides an inert atmosphere.

16. The system of claim 14, wherein the oven provides an oxygen-free atmosphere.

17. The system of claim 14, further comprising an electrochemical or electrolytic bath for surface treating the carbon particles.

* * * * *